United States Patent
Kelly et al.

[11] Patent Number: 6,106,446
[45] Date of Patent: *Aug. 22, 2000

[54] AUTOMATIC TOOL CHANGING MACHINE

[75] Inventors: Rory T. Kelly, Escalon; Brian E. Lane, Ripon; Dennis W. McDaniel, Lodi, all of Calif.

[73] Assignee: Haeger, Inc., Oakdale, Calif.

[*] Notice: This patent is subject to a terminal disclaimer.

[21] Appl. No.: 09/289,452

[22] Filed: Apr. 9, 1999

Related U.S. Application Data

[63] Continuation-in-part of application No. 09/148,408, Sep. 4, 1998.

[51] Int. Cl.[7] .............................. B23Q 3/155; B21J 15/00; B23P 19/04
[52] U.S. Cl. ................................ 483/28; 29/788; 29/798; 227/55; 227/107; 483/29
[58] Field of Search .................................... 483/1, 28, 29; 227/15, 18, 55, 57, 119, 120, 107, 99; 29/798, 818, 788, 26 A

[56] References Cited

U.S. PATENT DOCUMENTS

| | | | |
|---|---|---|---|
| 937,150 | 10/1909 | Havener | 227/55 |
| 1,730,140 | 10/1929 | Havener | 227/57 |
| 3,811,179 | 5/1974 | Anderson | 29/568 |
| 4,205,427 | 6/1980 | Koch et al. | 29/568 |
| 4,410,103 | 10/1983 | Fuhrmeister | 227/105 X |
| 4,691,429 | 9/1987 | Goodsmith | 29/818 X |
| 4,696,091 | 9/1987 | Kitamura | 29/568 |
| 4,719,691 | 1/1988 | Klingel | 29/568 |
| 5,269,739 | 12/1993 | Maynard et al. | 483/29 |
| 5,285,567 | 2/1994 | Thuswaldner | 29/786 |
| 5,326,201 | 7/1994 | King | 409/251 |
| 5,463,807 | 11/1995 | Hochhavsl | 29/798 X |
| 5,488,767 | 2/1996 | Franovick | 29/786 |
| 5,619,788 | 4/1997 | Schmidt | 29/798 |
| 5,669,866 | 9/1997 | Julian et al. | 483/1 |
| 5,762,594 | 6/1998 | Hoppe | 483/56 |
| 5,779,127 | 7/1998 | Blacket et al. | 223/107 |

FOREIGN PATENT DOCUMENTS

| | | | |
|---|---|---|---|
| 193707 | 9/1986 | European Pat. Off. | 227/15 |
| 2949028 | 6/1981 | Germany | 29/798 |
| 350 3 408 | 8/1986 | Germany | 227/15 |
| 6275992 | 9/1994 | Japan | 29/798 |
| 2107570 | 5/1983 | United Kingdom | 29/788 |

*Primary Examiner*—William Briggs
*Attorney, Agent, or Firm*—Mark D. Miller

[57] ABSTRACT

The invention is a system for use in a single-anvil hydraulic press or compression system for automatically selecting and changing both the upper and lower tooling. The system is installed between the upper and lower compression anvils of a hydraulic press. The upper portion includes a set of holders for upper tools and adjacent orientation structures or jaws. The upper tool holders and jaws are mounted on a horizontal member that may be moved such that one of the upper tools is "selected" by being placed immediately below the upper anvil of the press. As part of this selection process, the anvil removes the tool from the selected holder, and holds it using pneumatic suction. Then the horizontal member shifts over so that the upper anvil is situated directly above the adjacent orientation structure for that tool. To switch to a different upper tool, the horizontal member again moves the (empty) holder below the upper anvil, whereupon the pneumatic suction is removed causing the tool to drop into the holder. The horizontal member then moves to the newly selected tool holder and removes the tool therefrom using the pneumatic suction. Then the horizontal structure shifts over so that the upper anvil is situated directly above the adjacent orientation structure for the newly selected tool.

3 Claims, 17 Drawing Sheets

AUTOMATIC TOOL CHANGING MACHINE

This application is a continuation-in-part of application Ser. No. 09/148,408 filed on Sep. 4, 1998 pending.

BACKGROUND OF THE INVENTION

1. Field of the Invention

The present invention relates to automatic or semi-automatic fastener insertion machines, and more particularly to a method and apparatus for automatically changing the upper and/or lower tools of a fastener insertion machine.

2. Description of the Prior Art

Fastener insertion machines are sometimes referred to as presses or hydraulic presses. These machines use very high pressure to permanently attach fasteners of different sizes and shapes to workpieces. In a typical fastener insertion machine, an upper tool and a lower tool are provided in vertical alignment. A flat surface on a workpiece is placed between the upper and lower tools of the machine. The workpiece is positioned either manually or automatically so that the appropriate location (usually a pre-cut opening) on the workpiece is placed between the machine tooling to receive the fastener. A fastener is delivered to the machine tooling, and the machine is then operated such that the upper and lower tooling are pressed firmly together causing the fastener to be attached to the workpiece. The tooling then retracts, allowing the workpiece to be moved or removed before the next insertion cycle.

Fastener insertion machines typically require that both the upper and lower tooling correspond to the particular fastener to be inserted. Fasteners of different sizes and shapes generally require different upper and lower tooling; the same tooling is generally not usable for more than one type of fastener. Once the upper and lower tooling is set, the insertion machine may be operated repetitively to insert hundreds or thousands of the same kind of fasteners into workpieces.

It is becoming increasingly more common for a single workpiece to require the insertion of more than one different kind of fastener. Using existing fastener insertion machines, this may be accomplished by passing a batch of workpieces through a single insertion machine several times, changing the tooling and the fastener to be inserted on each pass. This approach is inefficient, time consuming, and expensive because, among other things, the same batch of workpieces (potentially many thousands of them) must be accumulated and stored following each pass through the machine, pending the change to the next set of tooling/fastener for the next pass.

Alternatively, a different fastener insertion machine could be used to insert each different fastener on the workpiece. While such an assembly line of insertion machines would be more efficient than using a single machine, it is a much more expensive proposition. A better solution would be a single machine that is capable of automatically changing tooling so that many different kinds of fasteners could be inserted on a workpiece during a single pass of the workpiece through the machine.

There are a number of tool changing devices that have been developed for punch presses in the prior art. (E.g. U.S. Pat. Nos. 4,205,427; 4,719,691; 5,699,866.) Such devices generally include a magazine of alternative upper tools which can be swapped out using one of a variety of grippers. However, since these machines have been developed for punch presses which generally cut holes into workpieces, they generally deal with changing only the upper cutting tool. Other tool changing devices such as those described in U.S. Pat. Nos. 3,811,179; 4,696,091 and 5,762,594 describe similar devices which are also designed to only change the upper tools using a magazine of available tools. U.S. Pat. No. 5,326,201 describes a complicated mechanism for changing upper tools in a blind broaching machine. However, neither this nor any of the above listed inventions make any provision for changing the lower tooling. U.S. Pat. No. 4,269,739 describes a tool changing device for a turret punch press which includes changing the lower tooling; however, the turret operation of this device is highly specific, and differs greatly from the present invention. None of the above inventions make any provision for supplying fasteners to the tooling, holding the different fasteners associated with different tooling, or changing to a different fastener supply with the change in tooling.

SUMMARY OF THE INVENTION

The present invention provides a method and apparatus for exchanging both the upper and lower tooling on a fastener insertion machine. The device of the present invention is used in a typical C-frame press having a vertical hydraulic ram which drives an upper tool down vertically until it makes contact with a lower tool.

The upper tool is provided with two separate vacuum ports. The first vacuum is used to secure a small removable tooling extension or tooling tip to the flat end of the upper tool. The second vacuum pulls through both the upper tool and the tooling tip, and is used to hold fasteners in place against the tip during fastener installation. A movable tooling plate is provided in the vicinity of the upper tool. The tooling plate carries a set of alternative tooling dispensers. Each dispenser includes a tray for holding a removable tooling tip, a fastener feed tube, and a corresponding set of movable fastener orientation structures or holding jaws. The jaws may be slidable, pivotally mounted and spring loaded, and/or mechanically, electrically or pneumatically operated; or without a pivot, horizontally and/or vertically movable. The tooling plate is designed to be moved on a horizontal plane (in both the X and Y directions), and to also be tilted or moved vertically upwards for transferring tooling tips from the various trays.

In operation, the tooling plate is moved in the X and Y directions until the tooling tray of one of the dispensers is located directly below the upper tool. The plate is then tilted or moved vertically upward and the first vacuum of the upper tool is activated, causing the tooling tip to be removed from the tray and attached to the bottom of the upper tool. This vacuum remains activated for the entire time the selected tooling tip is in use. The tooling plate is brought back down, and then moved in the X and Y directions until the extended fastener holding jaws are brought directly below the upper tooling. The jaws are retracted (without retracting the entire tooling plate) to receive a fastener from the feed tube, and then extended forward again into position below the upper tooling, now holding a fastener for insertion. The hydraulic ram then moves the upper tool (with tip) in a downward direction. As the tip comes into contact with the fastener, the second suction holds the fastener against the tip as it continues downward. The spring loaded jaws are forced open as the ram pushes the tooling through, eventually to be pressed against a workpiece above the lower tool.

In order to change to another upper tooling tip, the hydraulic ram is withdrawn, and the tooling plate is moved until the empty tray on the tool dispenser is positioned immediately below the upper tool. The tooling tray is tilted or moved vertically upward, and the first vacuum is removed allowing the tip to fall into the tray. The tooling plate is then brought down and moved until a different tooling tip is positioned below the upper tool. The tooling plate is again tilted or raised, and the first vacuum is re-activated in order to pick up the new tooling tip. Then, as previously described, the plate is brought back down, the fastener holding jaws associated with the new tip are moved into position, and fasteners are delivered for insertion.

On the C-frame support below the lower tooling, a movable continuous belt is provided which includes a plurality of pockets, each pocket designed to hold a lower tool piece. The top of each pocket is open, and the bottom of each pocket has an opening therein. The belt may be indexed forward or backward in order to line up a pocket holding a tool with the lower tool holder in the C-frame. A lift is located below the belt along the vertical axis defined by the tooling centerline. Once the pocket is in position, the lift is activated in order to raise the tool piece out of the pocket and bring it up to the lower tool holder. A clamp is then activated to hold the tool piece in position. This clamp also supports the lower tool piece, and must therefore be able to withstand the force exerted by the hydraulic cylinder during the insertion process. The lift is then withdrawn, allowing the operation of the hydraulic to commence.

To change the lower tool piece, the lift is raised to support the tool piece in the lower tool holder. The clamp is then removed, allowing the lift to bring the tool piece back down into its pocket. The belt is then indexed to line up another pocket containing a different tool piece below the lower tool holder. The lift then raises the new tool piece up to the lower tool holder where it is clamped in place.

In a first alternative embodiment, the belt of the lower tool changing mechanism is replaced with a rotatable cylinder having a plurality of slots located thereon for holding lower tool pieces. The slots may be moved into alignment with the lower tool support opening. The tool piece so aligned may then be lifted up to the lower tool holder where it is clamped in place.

In a second alternative embodiment, the belt of the lower tool changer is replaced by a linear indexing device having a plurality of pockets located thereon for holding lower tool pieces. This indexing device is located to the rear of and below the lower tool holder. A lift is provided to raise the selected lower tool up, and a horizontal track is provided for sliding the selected lower tool to the lower tool holder. A drawbar is provided for sliding along the track to bring lower tools back and forth between the lift and the lower tool holder.

In most cases, when the upper tooling is changed, it is also necessary to change the lower tooling in order to correspond. However, in some applications the same lower tool may be used with more than one (very similar) upper tool; likewise, in some applications, the same upper tool may be used with more than one (very similar) lower tool. Of course, where a given fastener (e.g. a threaded washer) is replaced by a dissimilar fastener (e.g. a threaded stud) both the upper and lower tooling must be changed.

It is therefore a primary object of the present invention to provide an apparatus that is capable of automatically changing upper as well as lower tool pieces in a fastener insertion machine.

It is also an important object of the present invention to provide an apparatus for changing upper tool pieces in a fastener insertion machine which also includes an apparatus for supplying different fasteners which correspond to the different tool pieces.

It is also an important object of the present invention to provide an apparatus for making a plurality of different upper tooling pieces available for use by a fastener insertion machine.

It is also an important object of the present invention to provide an apparatus for making a plurality of different lower tooling pieces available for use by a fastener insertion machine.

Other objects of the invention will be apparent from the detailed descriptions and the claims herein.

DETAILED DESCRIPTION OF THE PREFERRED EMBODIMENT

Figure 1:
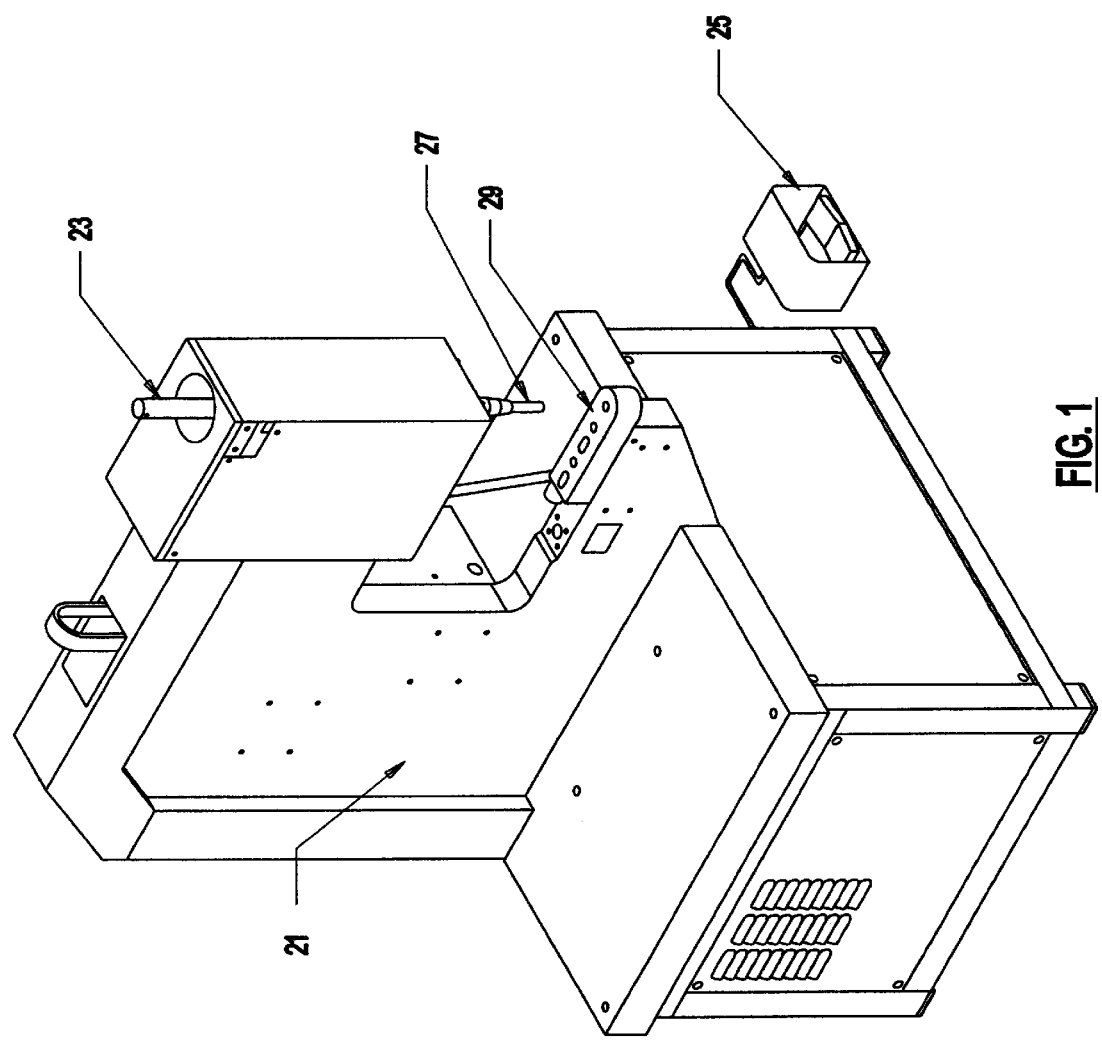
FIG. 1 is a perspective view of a typical C-frame fastener insertion machine.

Like reference characters designate like or corresponding parts throughout the several views. FIG. 1 depicts a typical manually operated fastener insertion machine. This machine is a C-frame press 21 with a vertical hydraulic ram 23. In use, an operator uses a foot pedal 25 to activate the ram 23 to drive an upper tool 27 down until it makes contact with a lower tool 31. At the tooling interface, fasteners may be squeezed into workpieces. This is accomplished by placing a workpiece having a prepared opening therein on the lower tool 31. A fastener may be inserted manually into the prepared opening before the workpiece is placed on the lower tool, or the fastener may be delivered automatically after the workpiece is in position on the lower tool. The squeezing or pressing action (often several hundred pounds, or even several tons per square inch) which occurs when upper tool 27 makes contact with the fastener, workpiece and lower tool 31 is sufficient to create a permanent joint between the fastener and the workpiece. The workpiece is then moved or removed to allow the machine to perform another operation. Some machines are capable of running automatically and typically include a workpiece positioning apparatus. The present invention can be used on all types of fastener insertion machines.

Referring to FIGS. 2–6 it is seen that the lower tool changing apparatus of the present includes a lower tool holder 29 attached to and supported by the lower half of C-frame 21. A movable belt 33 is provided along C-frame 21 below tool holder 29 such that it passes below the lower tool holder at one end and around a pulley 35 at the other end. A motor 37 and gear mechanism 39 are illustrated for imparting motion to belt 33 by rotating pulley 35; however, any appropriate indexing mechanism could be used to advance or retract belt 33.

A plurality of pockets 41 are provided along belt 33 for holding different lower tool pieces 31. Although only three pockets are depicted in FIGS. 2–6, any number of pockets could be made available on belt 33, space providing. Each pocket is open at the top, and has a floor at the bottom for supporting the different lower tool pieces 31. An opening is provided in the floor of each pocket 41 in order to receive movable rod 43 operated by lift 45. Lift 45 may be any suitable device such as a piston, a pneumatic cylinder, electric motor, or hydraulic.

Figure 1A:
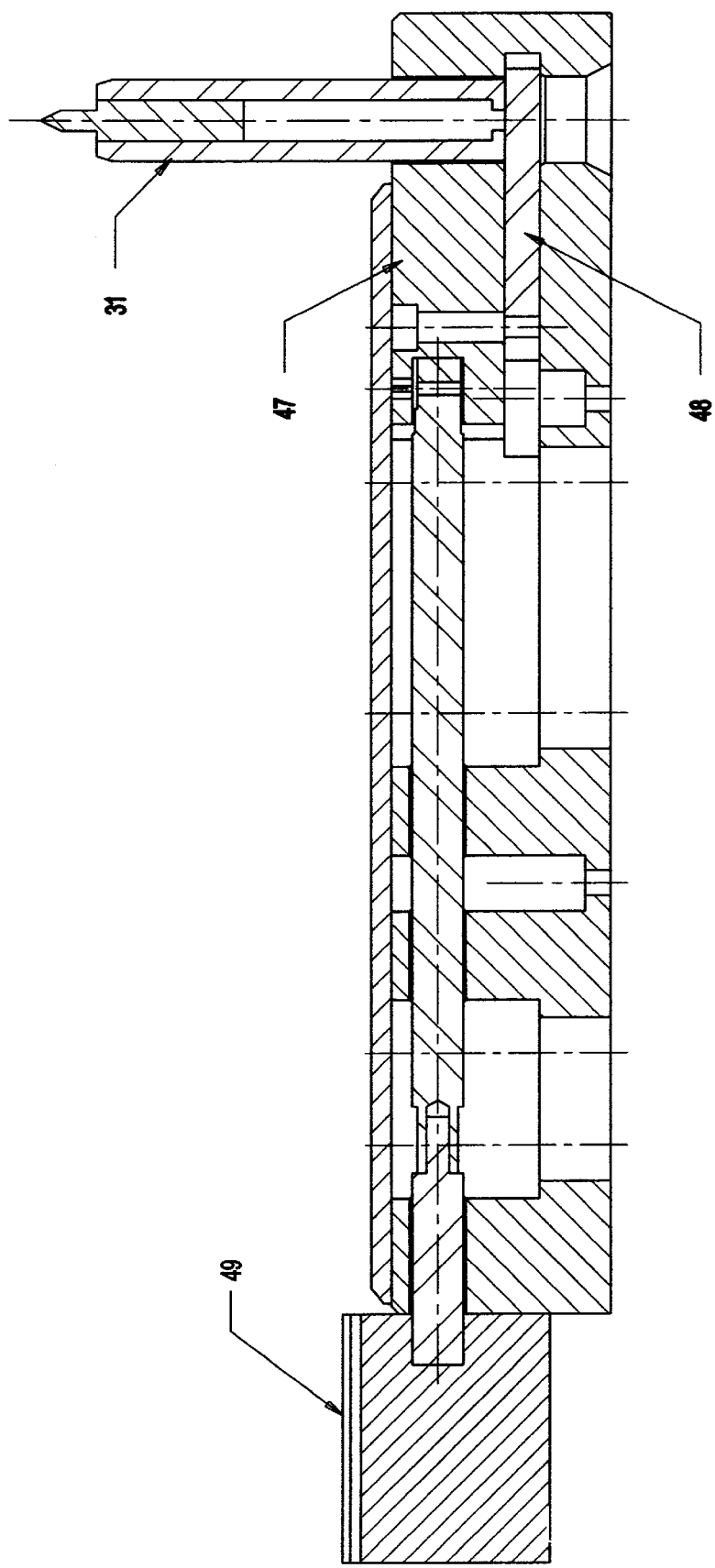
FIG. 1A is a cross sectional view of the lower tool changing assembly of the present invention.

A slidable clamp 47 operated by piston mechanism 49 is provided in lower tool holder 29 to hold a lower tool 31 in place. Mechanism 49 may be operated pneumatically, hydraulically or electrically. Clamp 47 also provides support for tool piece 31 at 48 sufficient to withstand the pressure exerted by the hydraulic ram 23 during operation. (See FIG. 1A).

Figure 2:
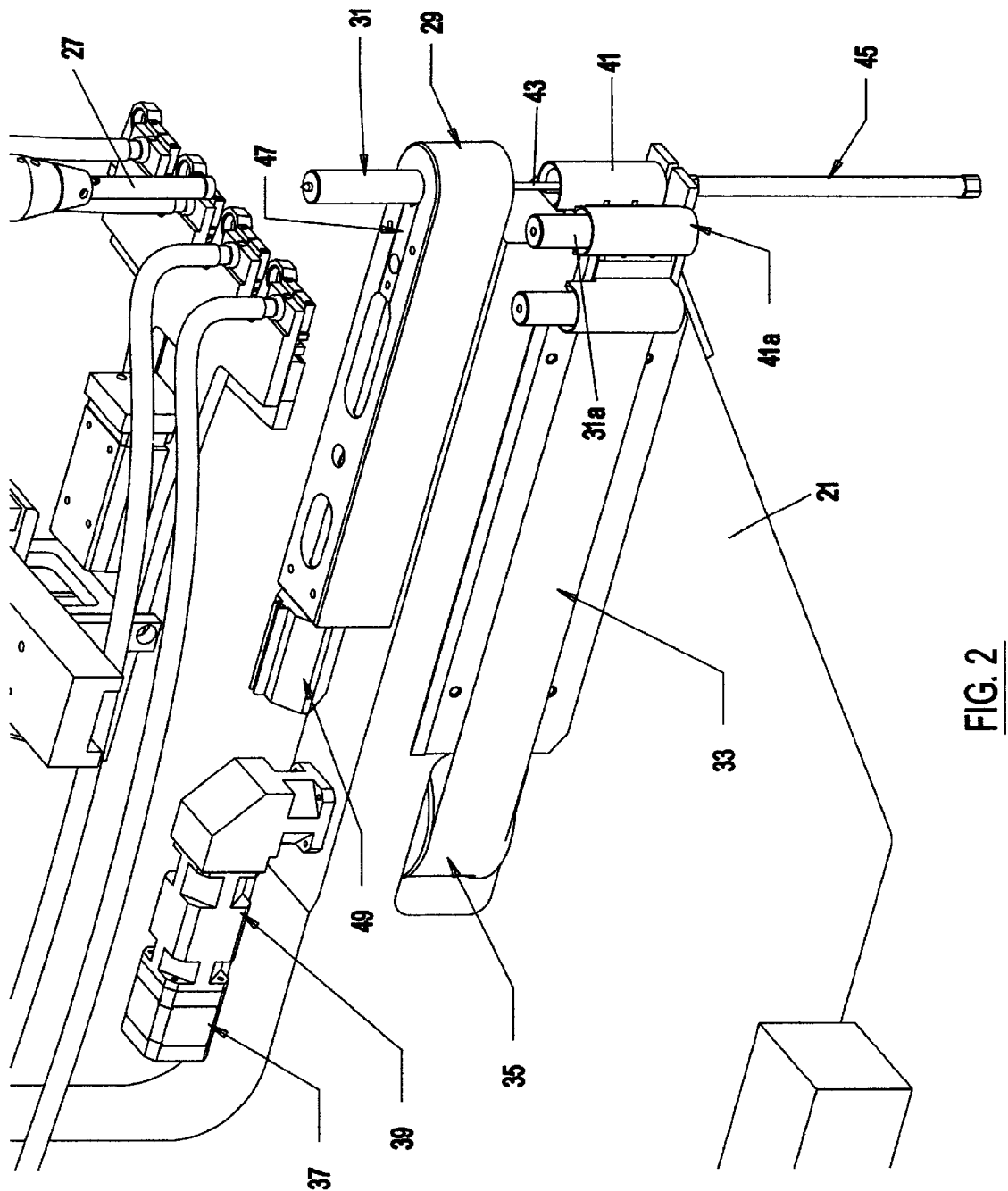
FIG. 2 is a perspective view of the lower tool changing apparatus of the present invention showing the clamp in a closed position.
Figure 3:
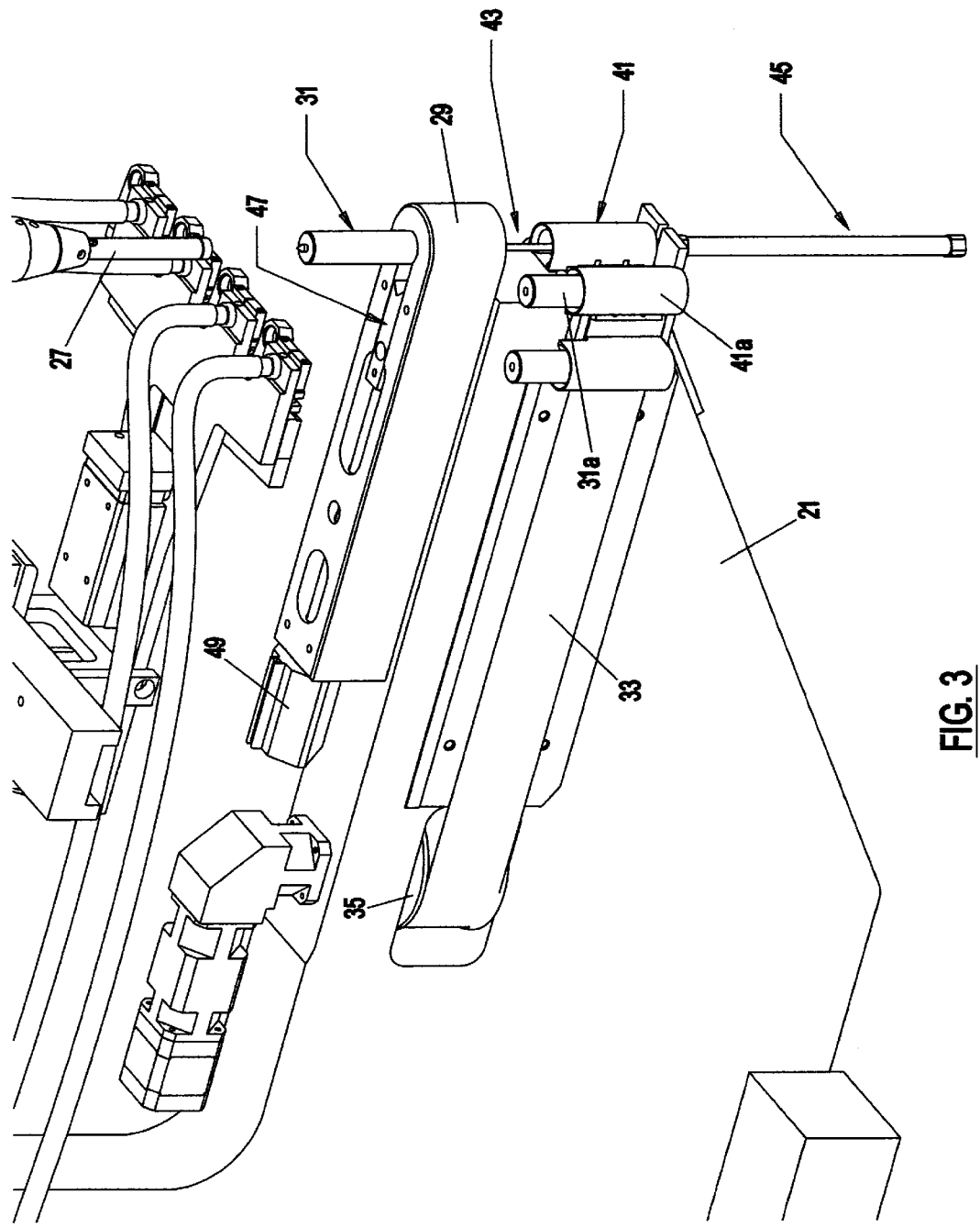
FIG. 3 is the perspective view of FIG. 2 showing the clamp in an open position.
Figure 4:
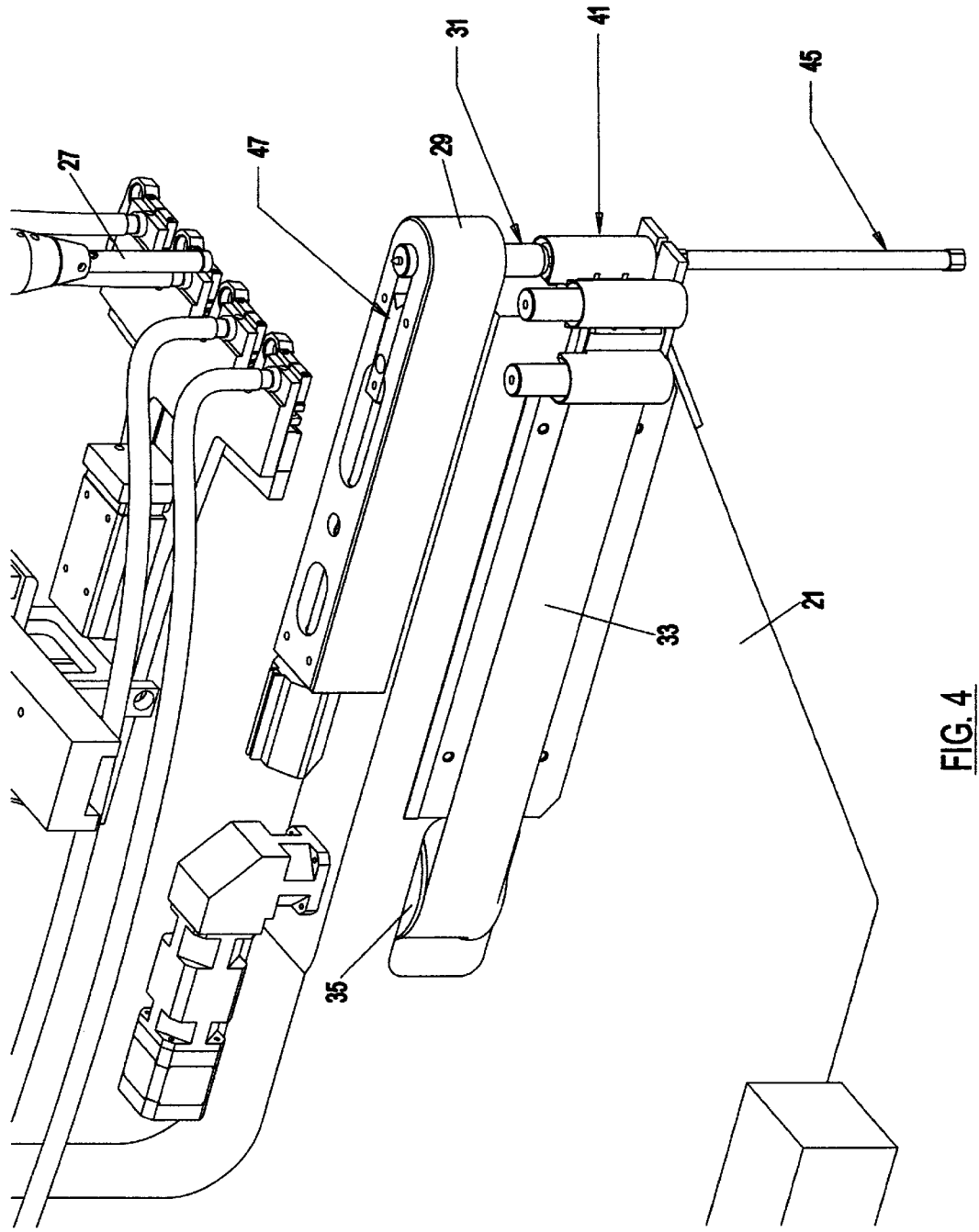
FIG. 4 is the perspective view of FIG. 3 showing the lower tool piece being lowered into a pocket.
Figure 5:
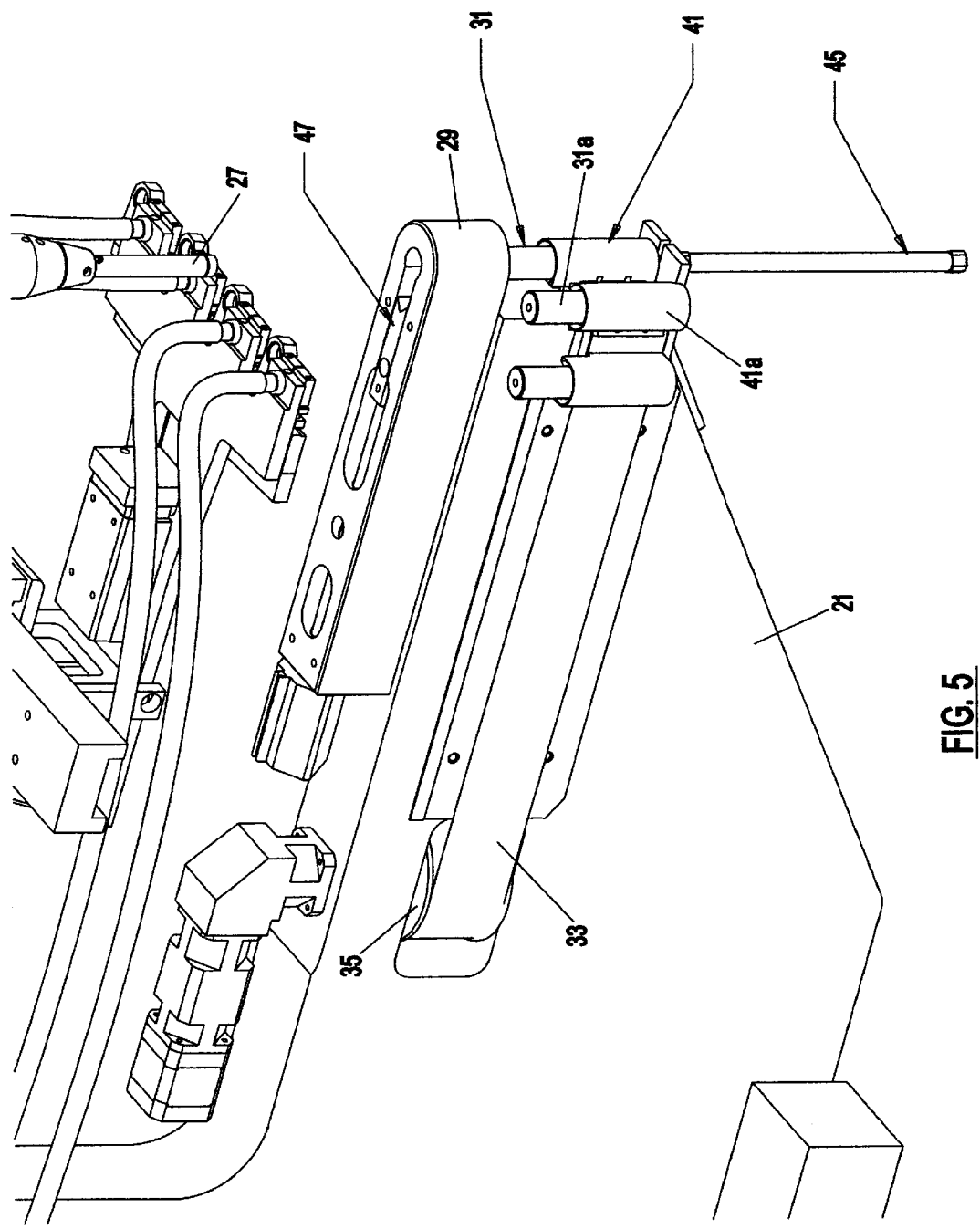
FIG. 5 is the perspective view of FIG. 4 showing the lower tool piece fully lowered into a pocket.
Figure 6:
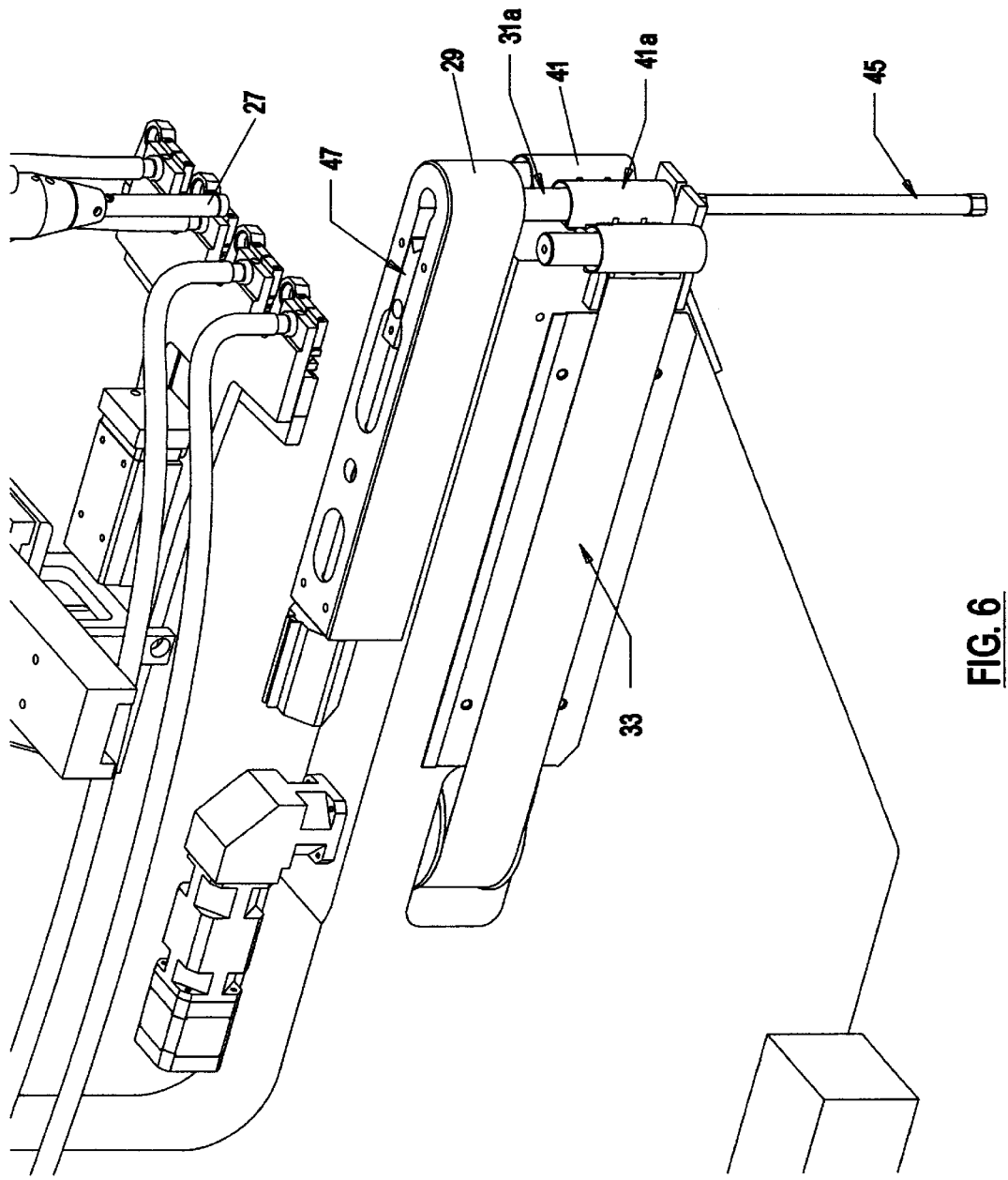
FIG. 6 is the perspective view of FIG. 5 after the belt has indexed one pitch bringing a new pocked under the lower tool holder.

FIGS. 2 shows a lower tool piece 31 held in place by clamp 47 on holder 29. To change lower tool pieces, rod 43 is extended upward by lift 45. Piston 49 is then operated to slide clamp 47 back in order to release the lower tool piece 31 as shown in FIG. 3. Lower tool piece 31 is now supported only by rod 43 which is then lowered by lift 45 as shown in FIG. 4. When rod 43 is fully retracted, piece 31 drops into pocket 41 as shown in FIG. 5. Belt 33 is then indexed to bring a different desired pocket with corresponding lower tool piece into position below tool holder 29 and above rod 43. Any of the pockets 41 of belt 33 may be moved into position for use in any order. In FIG. 6, the next pocket 41*a* on belt 33 has been moved into position. Lift 45 then raises rod 43 thereby moving lower tool piece 31*a* up into the lower tool holder 29. Once piece 31*a* is in position, piston 49 moves clamp 47 into place locking piece 31*a* into lower tool holder 29 for use. Rod 43 is then retracted until needed for the next tool change.

Figure 7:
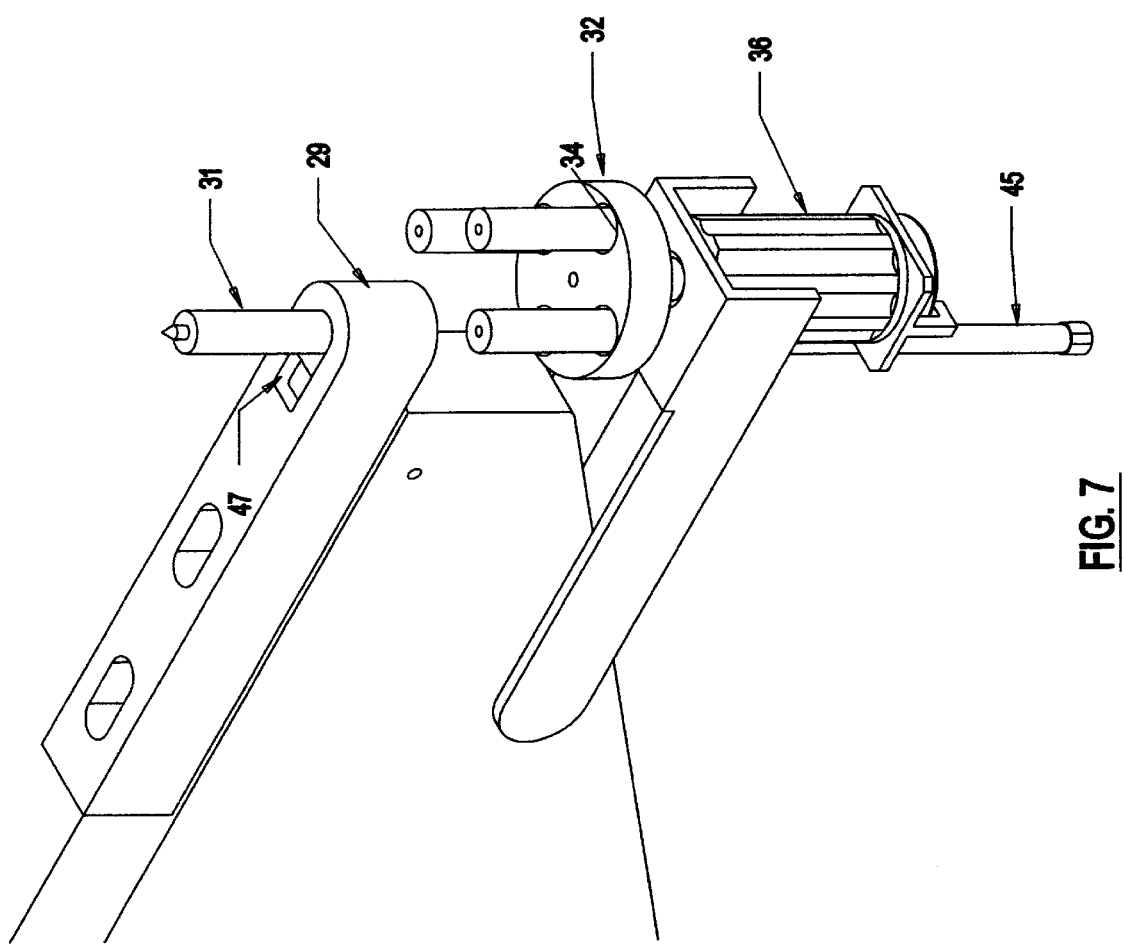
FIG. 7 is a perspective view of an alternative embodiment of a lower tool changing mechanism.
Figure 7A:
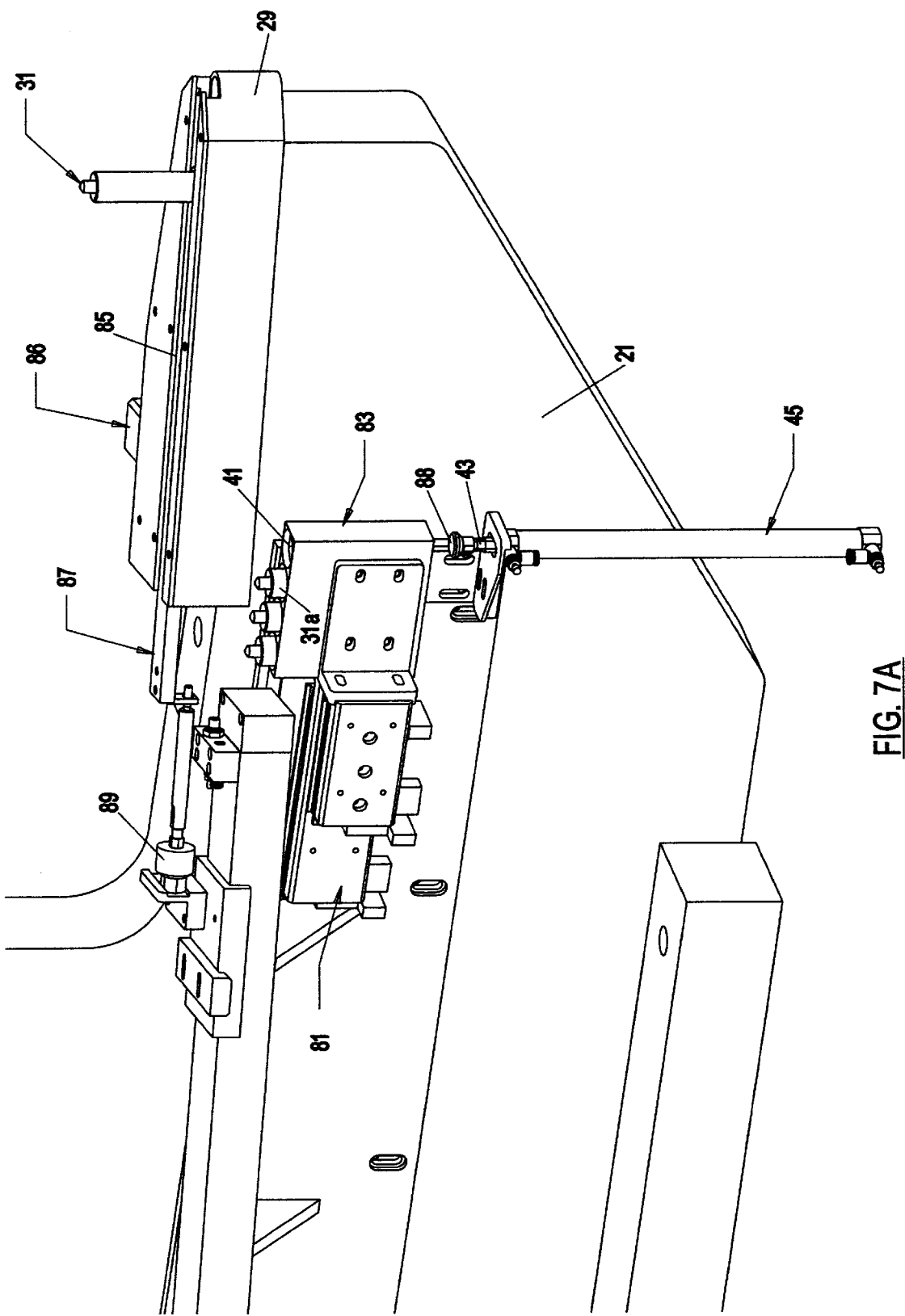
FIG. 7A is a perspective view of a second alternative embodiment of a lower tool changing mechanism.

An alternative embodiment of the lower tool changing apparatus is shown in FIG. 7A. In this embodiment, it is seen that the motor 37, gear 39 and belt 33 have been replaced with a linear indexing device 81 which includes a forward compartment 83 having a plurality of pockets 41 therein for holding lower tool pieces 31. Although only four pockets 41 are depicted in FIG. 7A, any number of pockets could be made available, space permitting. Each pocket 41 is open at the top, and has a floor at the bottom for supporting the different lower tool pieces 31. An opening is provided in the floor of each pocket 41 in order to receive movable rod 43 operated by lift 45. A circular disc or plate 88 is provided at the top of rod 43 to support tool pieces 31 as they are raised and lowered from pockets 41. Lift 45 may be any suitable device such as a piston, a pneumatic cylinder, electric actuator, or hydraulic.

In this embodiment, indexing device 81 and lift 45 are located to the rear of and below the lower tool holder 29. An elongated track 85 is provided which extends between lower tool holder 29 and lift rod 43. A slidable drawbar 87 operated by piston mechanism 89 is provided at the rear of track 85 to move lower tool pieces 31 between lift rod 43 (when extended) and tool holder 29. Mechanism 89 may be operated pneumatically, hydraulically or electrically.

A circular opening 90 (not shown) is provided in track 85 directly above lift rod 43. When rod 43 is raised to its uppermost position, disc 88 at the top of rod 43 fits flush into opening 90 in track 85. This creates a smooth floor on track 85 for sliding lower tool pieces 31 to and from holder 29. A separate opening 84 (not shown) is provided in drawbar 87 for receiving lower tool pieces 31 and holding them upright as they are moved back and forth along track 85. A clamp 86 along the side of track 85 acts by pushing against a tapered surface 92 or wedge (not shown) attached to the underside of drawbar 87 for pushing against it in a forward direction to lock the drawbar and lower tool 31 in position.

To change lower tool pieces, rod 43 is extended upward by lift 45 such that disc 88 is flush with the floor of track 85. Clamp 86 is released and mechanism 89 is operated to slide drawbar 87 back along track 85. Lower tool piece 31 is in opening 84 of drawbar 87 such that as drawbar 87 pulls back along track 85, it brings the lower tool piece 31 down the track from tool holder 29. Mechanism 89 stops when opening 84 of drawbar 87 is directly over opening 90. This opening may be filled by disc 88, lower tool piece 31 resting on said disc. Lift 45 then lowers rod 43 and disc 88 through pocket 41 to drop tool piece 31 into said pocket. Alternatively, lift 45 and rod 43 with disc 88 may be fully retracted such that when lower tool piece 31 is brought over opening 90, gravity causes tool piece 31 to drop into the pocket 41 waiting below.

Mechanism 81 is then indexed to bring a different desired pocket with corresponding lower tool piece into position below opening 90 and above rod 43 and disc 88. Any of the pockets 41 of mechanism 81 may be moved into position for use in any order. Lift 45 then raises rod 43 and disc 88 thereby moving the selected lower tool piece 31 up onto track 85, and into opening 84 of drawbar 87. Mechanism 89 is then operated to slide drawbar 87 forward along track 85. Opening 84 keeps lower tool piece 31 upright until it reaches lower tool holder 29. Clamp 86 is then engaged to hold lower tool piece 31 in place during use.

The upper tool changing mechanism is illustrated in FIGS. 8–14. A slidable tooling plate 51 is provided which supports a plurality of upper tool dispensers 53 slidably deployed on a shuttle tooling plate 56 beneath plate 51. Although four such dispensers are illustrated, any number may be provided depending on space limitations. Each dispenser includes a tooling tip holder 57 for holding removable tooling extensions or tooling tips 55. Each dispenser also includes a pair of slidable orientation structures or shuttle jaws 61 for holding fasteners. Jaws 61 may be pivotally mounted and spring loaded, and/or mechanically, electrically or pneumatically operated; or without a pivot, jaws 61 may be horizontally and/or vertically movable. A plurality of fastener feed tubes 59 are attached to plate 51, each adjacent to a tool dispenser 53. A linear actuator 50 is used to index tooling plate 51 in the direction depicted by arrows X of FIG. 8. A horizontal slide table 52 is used to move dispensers 53 in the direction depicted by arrows Y of FIG. 8. A tilt cylinder 63 is used to raise and lower plate 51 and attached dispensers 53 toward and away from the flat lower face of upper tool 27, pivoting at 65. Alternatively, any suitable mechanism may be used in place of cylinder 63 to move plate 51 and the attached dispensers 53 in a vertical direction.

Figure 9:
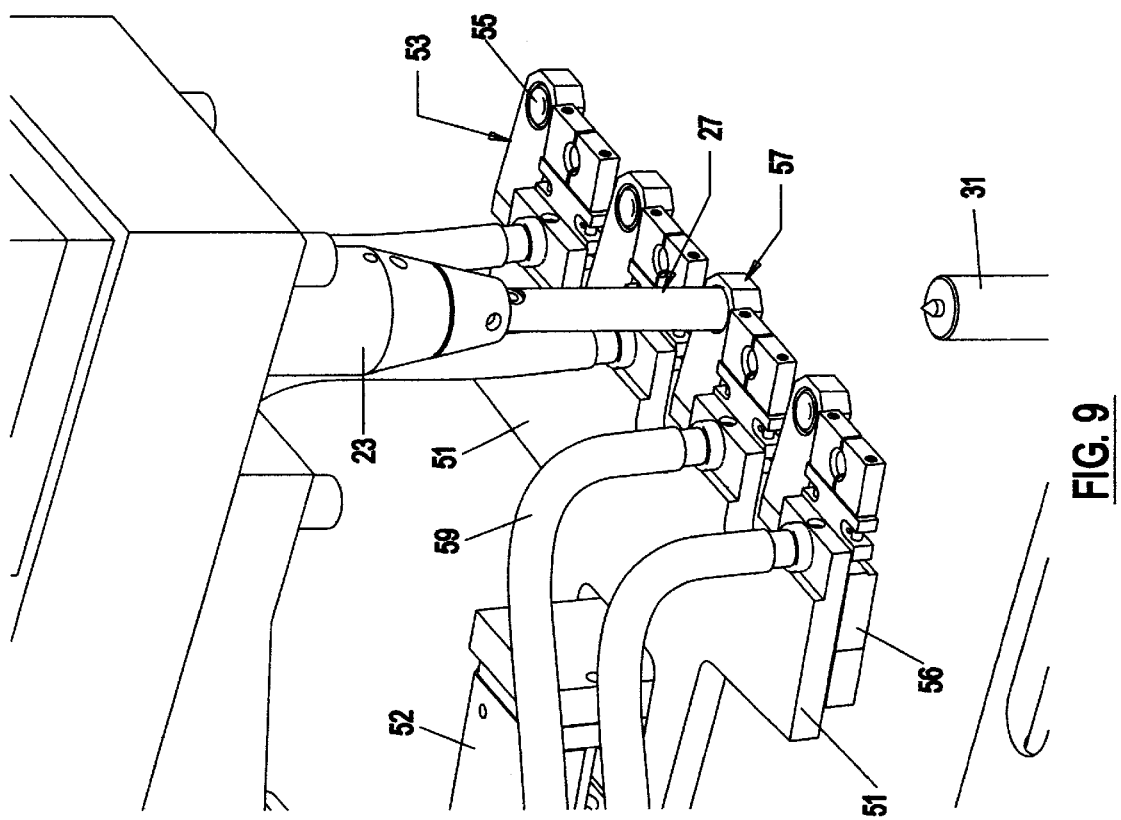
FIG. 9 is an enlarged perspective view showing the tooling plate in a tilted position for attachment of a tooling tip to the upper tool.
Figure 10:
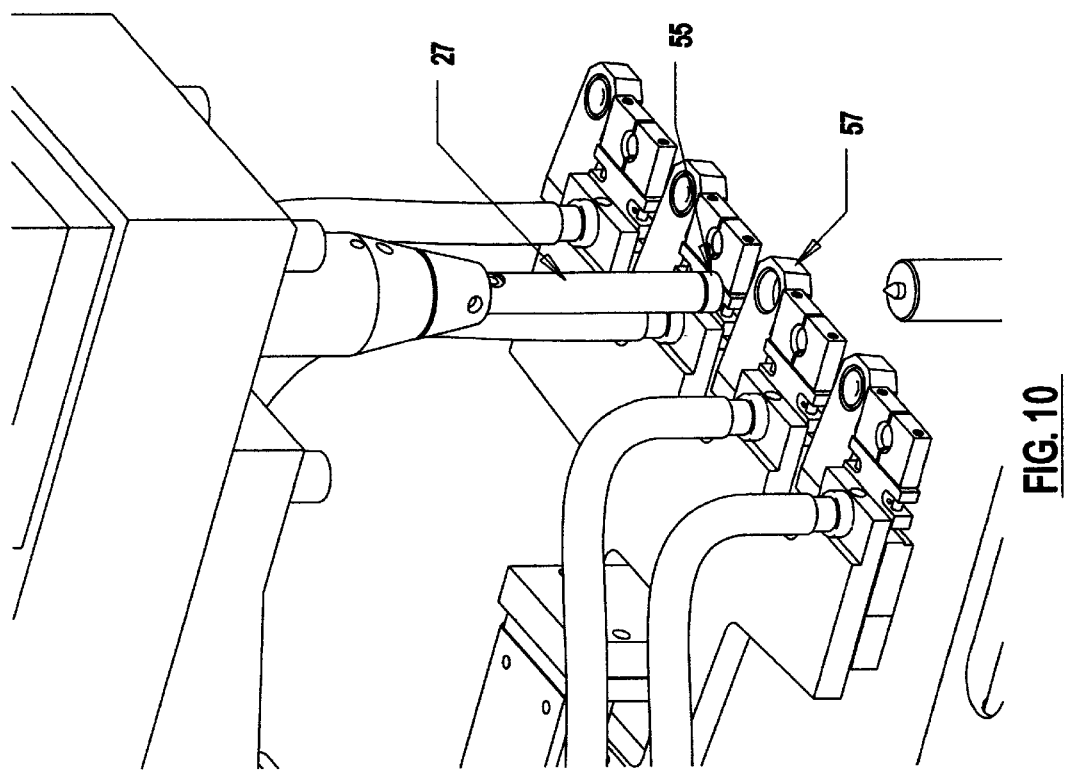
FIG. 10 is the perspective view of FIG. 9 after the tooling tip has been attached and the tooling plate has been retracted back to horizontal.

Once an upper tool extension 55 is selected, linear actuator 50 moves plate 51 so that the holder 57 of the dispenser 53 containing the selected tip 55 is beneath the upper tool 27. Slide table 52 moves shuttle plate 56 forward so that tip holder 57 is directly below upper tool 27. Then, cylinder 63 (or a suitable alternative vertical actuator) is activated to raise plates 51 and 56 upward raising tip holder 57 and bringing tip 55 directly into contact with tool 27 as shown in FIG. 9. A vacuum is then activated providing suction at the end of tool 27 which removes tip 55 from holder 57 and holds it against the flat bottom of upper tool 27. Cylinder 63 is then retracted, lowering plates 51 and 56, with tip 55 remaining attached to the end of tool 27 as shown in FIG. 10.

Figure 11:
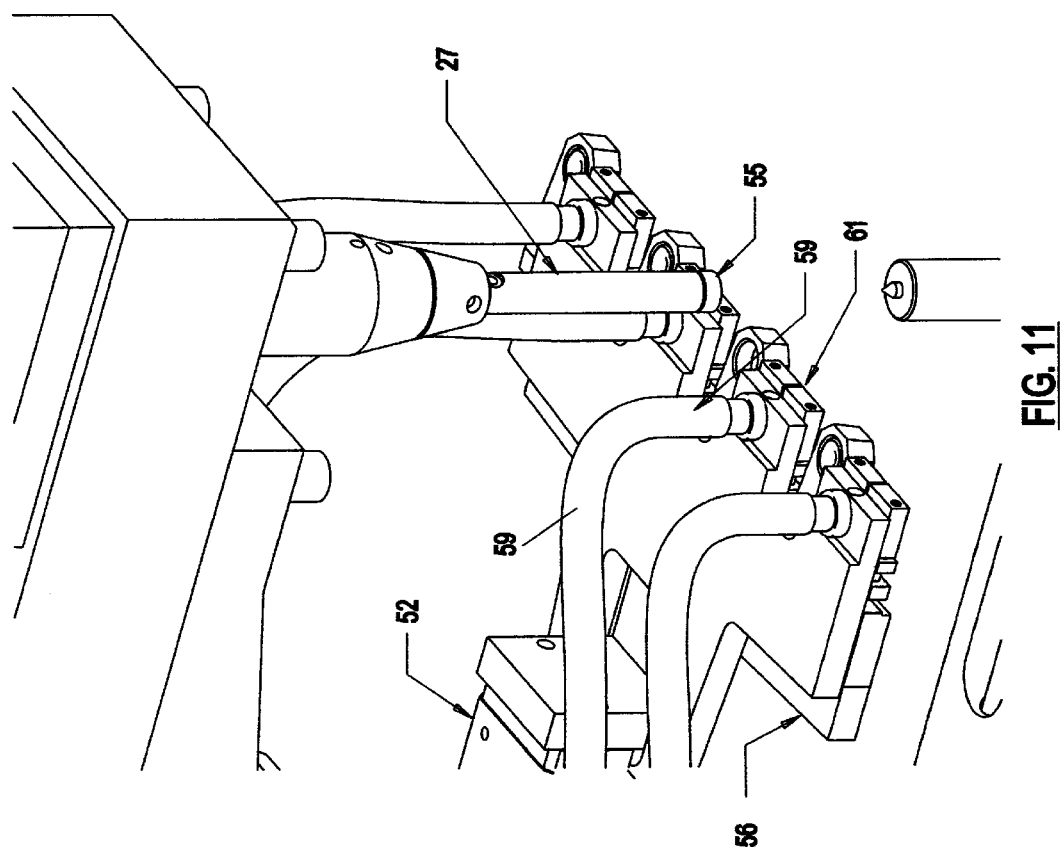
FIG. 11 is the perspective view of FIG. 10 showing the shuttle jaws retracted to receive a fastener.
Figure 12:
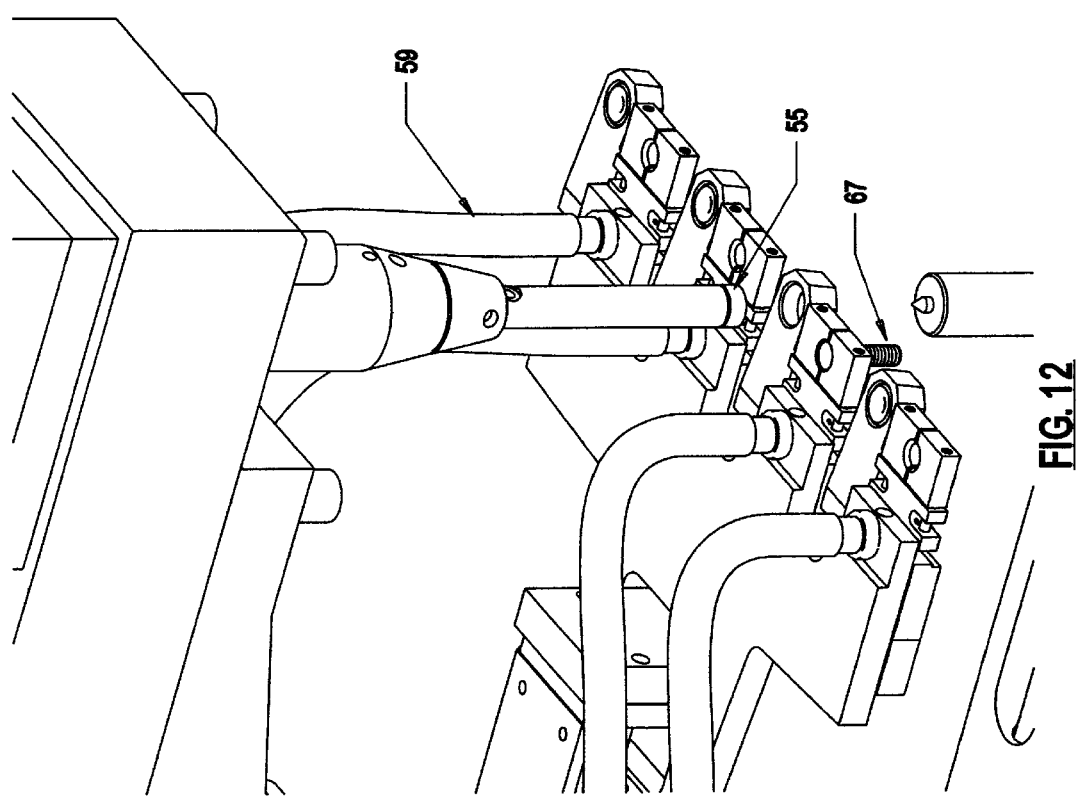
FIG. 12 is the perspective view of FIG. 11 showing the shuttle jaws extended and holding a fastener.
Figure 13:
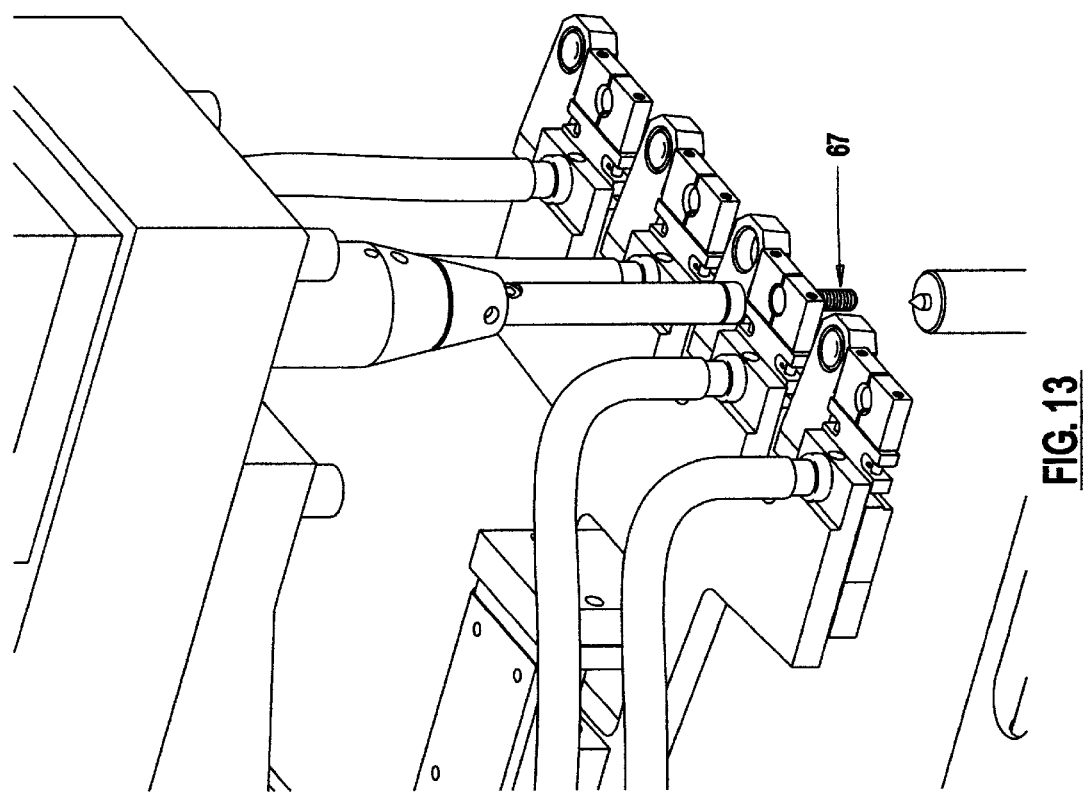
FIG. 13 is the perspective view of FIG. 12 showing the fastener aligned below the upper tool.
Figure 14:
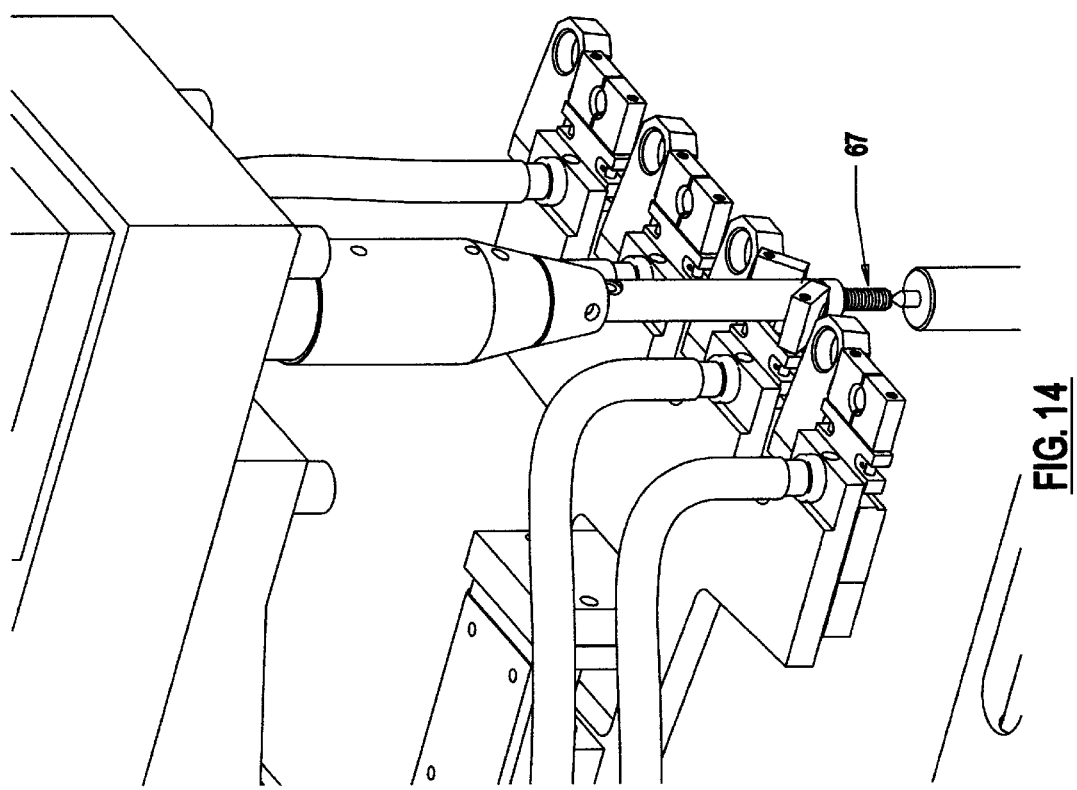
FIG. 14 is the perspective view of FIG. 13 showing the upper tool pushing through the shuttle jaws and moving the fastener down.

Once a tip has been attached to upper tool 27, linear actuator 50 may move plate 51 (in the X direction of FIG. 8) in order to align jaws 61 directly beneath upper tool 27 as shown in FIG. 13. Either before or after this alignment of the jaws, shuttle tooling plate 56 may be retracted and then extended in order for the jaws 61 to pick up a fastener as shown in FIGS. 11 and 12.

Figure 8:
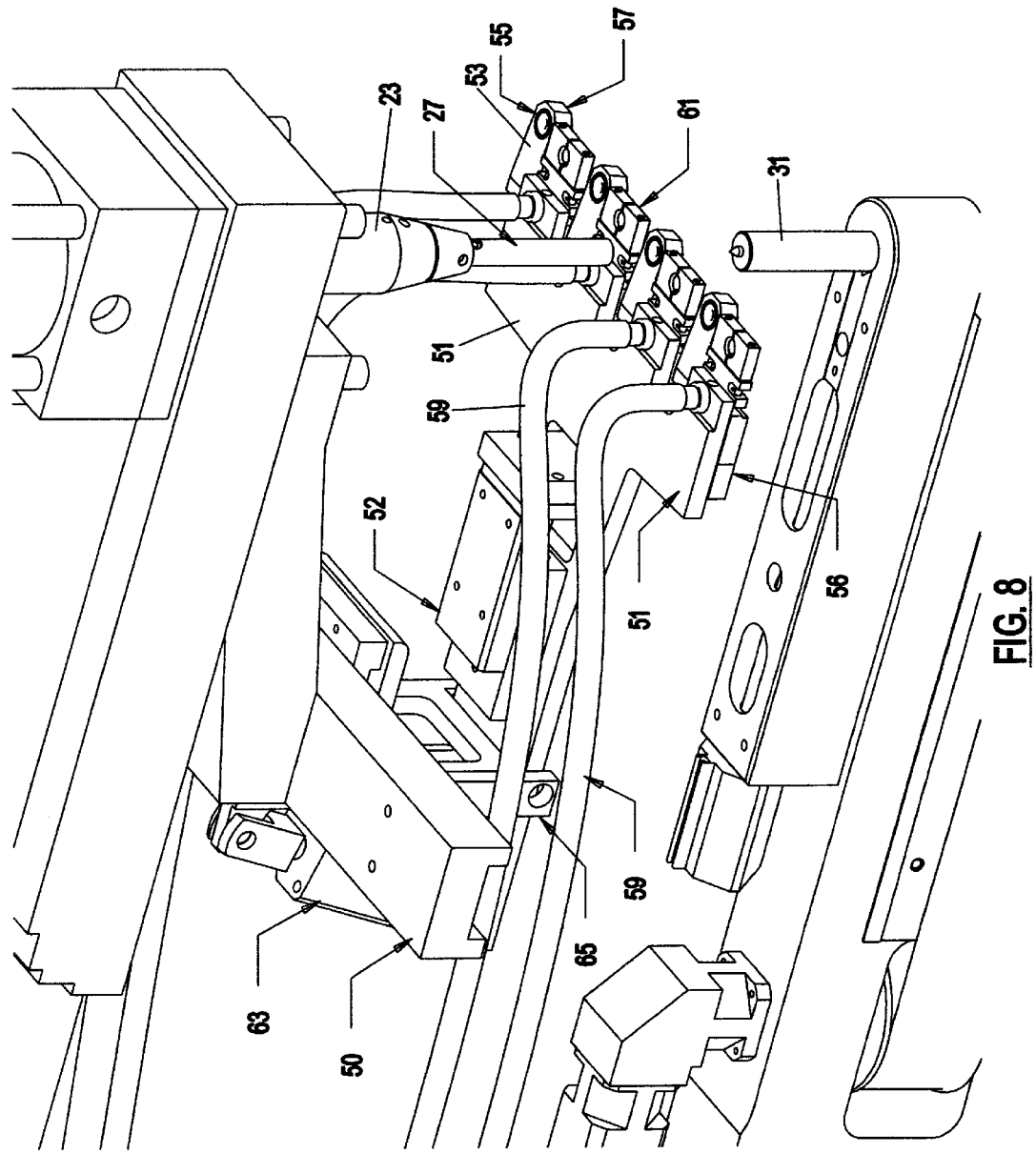
FIG. 8 is a perspective view of the upper tool changing apparatus of the present invention.

In order to pick up a fastener, slide table 52 is pulled in the direction of the Y arrow of FIG. 8 away from the tooling interface. This causes all of the dispensers 53 and their associated tool holders 57 and jaws 61 to be pulled beneath tooling plate 51 as shown in FIG. 11. A fastener 67 is then blown down tube 59 into the opening between the semi-circular edges of jaws 61. Slide table 52 is then extended out toward the tooling interface which pushes all of the dispensers 53, holders 57 and jaws 61 back out from under plate 51. Jaws 61 now hold fastener 67 as shown in FIG. 12. For efficiency, since all of the jaws of all of the dispensers shuttle back and forth each time the shuttle tooling plate 56 is moved, it is often desirable for each set of jaws 61 to pick up a fastener simultaneously. In that way, as soon as tool tip 55 is changed, linear actuator 50 may move plate 51 to align the upper tool 27 with the new set of jaws which already hold a fastener 67 ready for insertion as shown in FIG. 13. Once the jaws 61 are positioned below the upper tool 27, repetitive shuttle operations by slide table 52 can be used to deliver multiple additional fasteners to the tooling interface. Each fastener is inserted by the downward motion of ram 23 which pushes upper tool 27 and tip 55 against fastener 67 held by jaws 61. A second suction pulling through tool 27 and tip 55 holds fastener 67 against tip 55 as it continues downward for insertion. The pivotally mounted spring loaded jaws 61 bend as the upper tool 27 continues downward for insertion.

After the fastener insertion is completed, ram 23 retracts upward, bringing upper tool 27 and tip 55 with it. Meanwhile, jaws 61 may be shuttled by the back and forth operation of slide table 52 to pick up another fastener for insertion.

To change upper tool extensions, before another fastener is picked up, linear actuator 50 moves tooling plate 51 such that the upper tool 27 is positioned above an empty tool tip tray 57. Tooling plate 51 is moved up, the suction at the end of upper tool 27 is released, and tooling tip 55 drops into tray 57. Plate 51 is then moved down, and actuator 50 them moves plate 51 such that a different tray 57 is positioned below upper tool 27. Tooling plate 51 is again moved up, vacuum suction is activated at the end of upper tool 27, and the newly selected tooling tip 55 is attached to the end of the upper tool.

An appropriate computerized control mechanism should be used to coordinate the various functions of the upper and lower tool changing devices of the present invention. The control should not allow the upper tool to perform a press operation unless a lower tool has been placed in the lower tool holder and clamp 47 and support 48 activated. The control should also prevent more than one tool tip 55 from being placed in the same tray 57, or more than one lower tool 31 from being placed in the same pocket 41.

A plurality of appropriate orientation and singulation devices (such as that disclosed in U.S. Pat. No. 5,191,960) should be employed to deliver properly oriented fasteners 67 through tubes 59 using pneumatic pressure.

In use, as an example, a given workpiece may require insertion of nine identical fasteners of variety A, six of variety B, and three of variety C at wide ranging locations on the workpiece. For efficiency, the controls for the upper and lower tooling could be set so that the upper and lower tooling is changed for variety A, followed by nine shuttles of plate 56 so that nine fasteners are delivered in succession, the workpiece being moved to the appropriate location for each insertion. Following the ninth insertion, the control would change both the upper and lower tooling to the next variety B, followed by six shuttles and insertions. Finally the control would change the upper and lower tooling to variety C and complete the final three insertions. At this point, the next workpiece would be introduced, the upper and lower tooling changed back to variety A, and the process would repeat.

An alternative embodiment of a lower tool is illustrated in FIG. 7. Here, instead of using belt 33 with pockets 41, a rotatable cylinder 32 is provided below the support for the lower tool holder 29. Cylinder 32 includes a plurality of slots 34 for holding lower tools 31. A lift 45 is provided below the cylinder along the vertical axis defined by the tooling centerline. By rotating the cylinder 32, a slot 34 containing a lower tool 31 may be placed in position below the lower tool holder. The lift 45 is activated in order to raise the tool piece out of the slot and bring it up to the lower tool holder 29, as shown in FIG. 7. Clamp 47 is then activated to hold and support the tool piece in position. To change the lower tool piece using this embodiment, the lift 45 is raised to support the tool piece in the lower tool holder. The clamp 47 is then retracted, allowing the lift to bring the tool piece back down into its slot 34. Cylinder 32 is then indexed using motor mechanism 36 to line up another slot containing a different tool piece below the lower tool holder. Lift 45 then raises the new tool piece up to the lower tool holder 29 where it is clamped in place.

Figure 15:
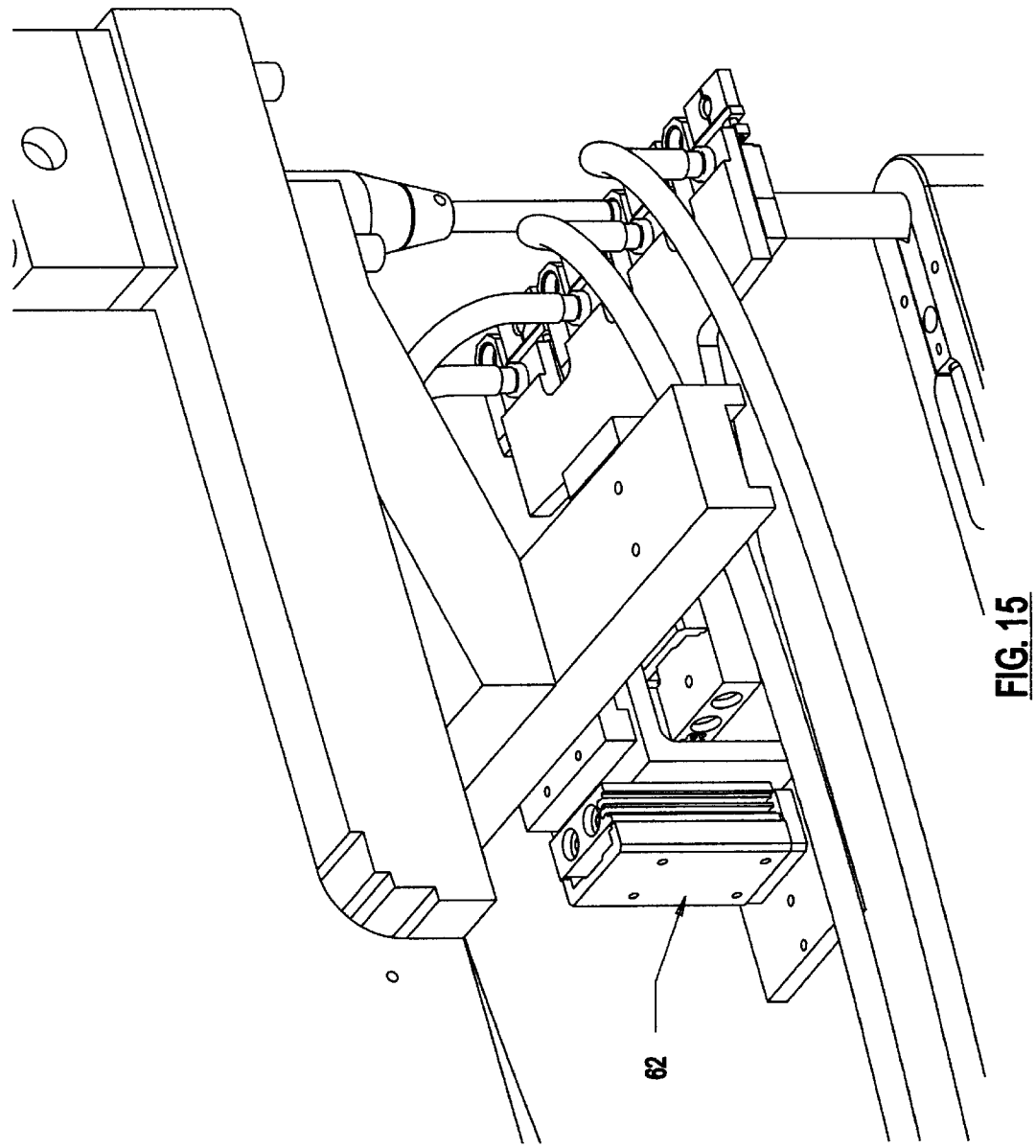
FIG. 15 is a perspective view of an alternative embodiment of the upper tool changing device of the present invention.
Figure 8:
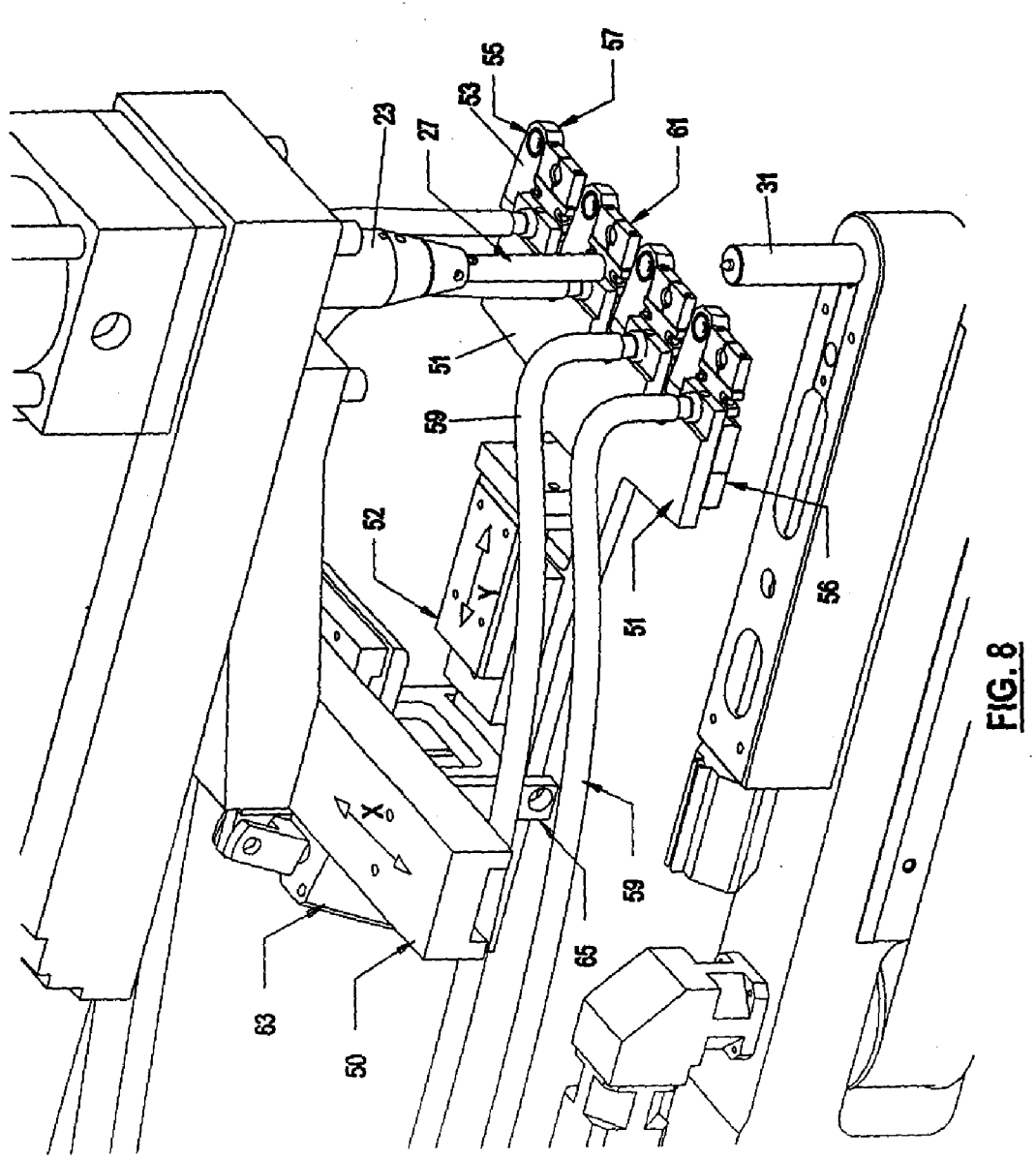

An alternative embodiment of the upper tool changer is illustrated in FIG. 15. Here, the tilt cylinder 63 is replaced with a slide table 62 that is similar to slide table 52 which is used to move shuttle plate 56. The illustration shows a pneumatic unit, but it could be equally otherwise powered. Instead of tilting, in this embodiment the tip trays 57 are raised and lowered vertically when transferring tooling tips 55.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. An apparatus for changing the tooling of a fastener insertion machine comprising an upper tool attached below a vertically operable ram; a lower tool support in vertical alignment with said upper tool; a movable plate member adjacent to said upper tool, said member supporting a plurality of dispensers, each dispenser including an upper tool extension tray, movable fastener support jaws and a tube for feeding fasteners to said dispenser; a first actuator for moving said plate member to align said dispensers with said upper tool; a second actuator for delivering fasteners to said support jaws; a first vacuum in said upper tool for holding tooling extensions against said upper tool; a second vacuum for holding fasteners against a selected tooling extension; a movable indexing mechanism having a plurality of pockets attached thereto located behind and below said lower tool support for holding lower tool pieces; a horizontal track behind said lower tool support having an opening therein at the end opposite said support; a vertical lift below said opening for raising and lowering lower tool pieces between said pockets and said opening; a moveable drawbar for shuttling lower tool pieces between said lift and said lower tool support; and a clamp for holding said drawbar and lower tool pieces in place.

2. The apparatus of claim 1 wherein a third actuator is provided for raising and lowering said plate member to facilitate delivery and removal of upper tooling extensions to said upper tool.

3. An apparatus for changing the lower tooling of a fastener insertion machine comprising an upper tool attached below a vertically operable ram; a lower tool support in vertical alignment with said upper tool; a movable indexing mechanism having a plurality of pockets attached thereto located behind and below said lower tool support for holding lower tool pieces; a horizontal track behind said lower tool support having an opening therein at the end opposite said support; a vertical lift below said opening for raising and lowering lower tool pieces between said pockets and said opening; a moveable drawbar for shuttling lower tool pieces between said lift and said lower tool support; and a clamp for holding said drawbar and lower tool pieces in place.

* * * * *

UNITED STATES PATENT AND TRADEMARK OFFICE
CERTIFICATE OF CORRECTION

PATENT NO.    : 6,106,446
DATED         : August 22, 2000
INVENTOR(S)   : Kelly et al.

It is certified that error appears in the above-identified patent and that said Letters Patent is hereby corrected as shown below:

Drawing sheet, consisting of Fig. 8, should be deleted and replaced with the drawing sheet, consisting of Fig. 8, as shown on the attached page.

Signed and Sealed this

Tenth Day of May, 2005

JON W. DUDAS
*Director of the United States Patent and Trademark Office*